Patented May 12, 1942

2,282,787

UNITED STATES PATENT OFFICE 2,282,787

STABILIZATION OF FOOD COMPOSITIONS

Sidney Musher, New York, N. Y., assignor to Musher Foundation Incorporated, New York, N. Y., a corporation of New York No Drawing. Application March 11, 1942, Serial No. 434,253

8 Claims. (Cl. 99—11)

The present invention relates to the preparation of a stabilized vitamin containing food product and more particularly to the stabilization of fat soluble vitamin containing oils or oil soluble vitamins whereby they are substantially protected against oxidative deterioration and loss of their vitamin values.

The fish and fish liver oils including cod liver oil, halibut liver oil, tuna liver oil, herring oil, salmon oil, menhaden oil, sardine oil, shark liver oil, etc., as well their fat soluble vitamin concentrates including largely the unsaponifiable fraction extracted or removed therefrom are all highly subject to oxidative deterioration, loss of vitamin A content and the development of rancidity.

In addition to vitamin A and the oils containing this fat soluble vitamin, its pro-vitamin carotene as well as oils in which it occurs such as alfalfa oil or extracts of the cereal grasses or other fodder and forage legumes and grasses and also the oils extracted from carrots and other vegetable plant materials high in carotene are readily subject to oxidative deterioration.

The other fat soluble vitamins which are similarly subject to deterioration upon standing or upon exposure to air include activated ergosterol or calciferol as one of the forms of vitamin D, as well as vitamin $D_2$ and also vitamin $D_3$ or 7-dehydro cholesterol together with other forms of vitamin D either in their pro-vitamin or natural forms and whether produced synthetically or extracted by solvents or other special means, vitamin E or alpha-tocopherol and vitamin K including $K_1$ and $K_2$, whether extracted from natural sources such as by removal of the oil soluble substances present in alfalfa, cereal grasses, etc. and also the synthetic oil soluble vitamin product such as 1,4-naphthoquinone and other similar quinones.

These fat soluble vitamins which may be present either in substantially pure condition or dissolved in oil or which may be extracted from a natural source by removal of the glyceride oils as well as oil soluble vitamins from these substances or which may be prepared by special procedures such as by removal of the unsaponifiable fraction from the fish and fish liver oils are all readily subject to deterioration particularly when subjected to contact with water or when exposed to air.

These products have also been found to be subject to oxidation very readily when used in connection with the preparation of various food containing minerals, particularly copper, and also when prepared in emulsified form where the fat globule or the water insoluble vitamin is surrounded with moisture that would tend to promote oxidation and loss of vitamin value.

It has now been found that emulsions and aqueous dispersions of these oil soluble vitamin compositions may be prepared which will be highly stable and which will not only tend to maintain the vitamin potency and retard oxidative deterioration and rancidity but will tend to render them even more stable to oxidative deterioration than if they were kept in substantially pure condition and not in the aqueous dispersion.

It has been found that the stabilizing effect of the present invention may be obtained by dispersing or emulsifying these vitamin containing fish and fish livers and other vitamin oil compositions in concentrated corn extracts and particularly in the concentrated extract of whole corn obtained by steeping the whole corn in dilute sulphurous acid prior to extraction and separation of the starch, gluten and other materials therefrom.

The whole corn is, for example, steeped in water at a temperature not exceeding 125° F. for a period of at least about 15 hours and desirably at a temperature of between 105° F. and 120° F. for about 30 to 40 hours and at a pH between about 3 and 4.5, the preferred acid being sulphurous acid.

The corn may be soaked in an aqueous medium of sulphurous acid and at a desirable pH of around 3.2 using from 1 to 10 parts of water to each 2 parts of corn.

When the corn is soaked in this sulphurous acid medium at a temperature between 105° F. and 120° F. for a period of 18 to 45 hours, for example, the extract takes on enhanced desirable characteristics for use in accordance with the procedures of the present invention.

After the soaking of the corn, the suphurous acid water is drained away whereby desirable materials having enhanced antioxygenic properties are removed from the corn which may be utilized in accordance with the present invention.

The solution is then subjected to vacuum concentration to over about 60% total solids and desirably to 70% or more total solids.

The unconcentrated or concentrated extract may be heated to over 135° F. such as to 150° F. for several minutes to drive off excess sulphurous acid. At the same time a coagulable fraction may be precipitated out and this fraction may thereupon be removed where desired by filtration, centrifuging or similar means.

The solution, with or without partial evaporation, may where desired be neutralized to a pH between about 5.0 and 6.9 and desirably to a pH of about 6. The neutralization is effected by the use of soda lye, lime, bicarbonate of soda or similar alkalinizing material.

After neutralizing, the insoluble materials may be removed by filtration or centrifuging and the water soluble extract free of water insoluble materials is further concentrated under reduced pressure to over about 60% total solids, and desirably to 75% or more total solids.

Where the extract has a tendency to foam at a pH of about 5.5 to 6, the neutralizing need not be effected until after concentration.

In no case should the temperature of concentration exceed about 125° F. to 135° F. in order to obtain the most desirable product having enhanced antioxygenic properties, light color and mild odor and flavor.

The concentrated extract thus obtained is a brown viscous material, readily soluble in water. The extract contains about 24% to 35% nitrogen determined as protein and about 12% to 20% water soluble carbohydrates.

Apparently the extract prepared in this manner contains the proper proportion of ingredients so that when these vitamin containing oil compositions are dispersed thoroughly in or preferably emulsified with the corn extract, the oil soluble vitamins are rendered substantially stabilized against oxidative deterioration.

The vitamin containing oil may be added to the concentrated corn sulphurous acid extract in any minor amount, but it is preferable to add less than 15% of the vitamin oil to the extract and for the oil to be thoroughly emulsified or dispersed therein. It is important that the oil occupy the continuous aqueous phase in order to obtain the desirable results of the present invention.

It has been found of particular importance for the extract to contain at least about 20% to 25% total solids before incorporating the vitamin oil therein, but this extract must be sufficiently aqueous so as to obtain a proper dispersion of the oil in the aqueous continuous medium of the extract.

After the vitamin oil has been emulsified in or dispersed in the aqueous corn extract, so that the oil occupies the discontinuous phase, the resultant product may further be evaporated or concentrated or may be completely dried.

The corn extract is desirably concentrated to at least 40% to 45% total solids before the vitamin oil is emulsified therein, and desirably to 70% or more total solids.

It has been found of particular importance for the extract to contain at least about 20% to 25% total solids before incorporating the vitamin oil therein, but this extract must be sufficiently aqueous so as to obtain a proper dispersion of the oil in the aqueous continuous medium of the extract.

After the vitamin oil has been emulsified in or dispersed in the aqueous corn extract so that the oil occupies the discontinuous phase, the resultant product may further be evaporated or concentrated or may be completely dried.

The vitamin oil may be emulsified in the course of the drying of the extract, provided the vitamin oil occupies the discontinuous or disperse phase and is added to the extract while it is in substantially aqueous condition.

Although a thorough admixture of the vitamin oil in the dilute sulfurous acid extract of corn which extract is then concentrated is sufficient to produce markedly improved stability, homogenization or other similar processing such as by placing the combination through a colloid mill which would more thoroughly produce contact between the oil globules and the extract will give even greater stabilizing action. This result is particularly unusual since it is normally to be expected that the oil globules in contact with the water of the extract would be rendered much more unstable than if they were not in contact with such aqueous products.

During the homogenization of the vitamin oil in the extract, it is particularly desirable for the homogenization to take place at a slightly elevated temperature such as over about 180° F. and preferably at between 200° F. to 210° F. or more. Apparently an enhanced stabilization takes place where the homogenization is permitted to proceed at the elevated temperature.

There may be utilized not only single oil soluble vitamin compositions such as concentrates containing vitamin A or carotene alone, but also combinations of these various oil soluble vitamins including those which contain vitamin A, vitamin D or vitamins A, D and K, etc.

There may furthermore be utilized the various synthetic fat soluble vitamin compositions even though these are not chemically identical with the natural product, but which nevertheless have similar physiological functions and which are also subject to oxidative deterioration.

In the case of vitamin E, this may be utilized either as alphatocopherol or in the form of wheat germ oil, for example, which may be extracted or expelled from wheat germs.

Similar extracts may also be prepared by solvent extraction as by the use of hexane or similar oil solvents from other cereal germs, grasses or polishes known to be high in these fat soluble vitamins.

There may also be utilized the water insoluble or oil soluble vitamins which may be removed from the forage legumes or forage grasses including alfalfa, red clover, spring vetch, winter vetch, soya beans, and particularly their leaves and stalks and also as contained in the cereal grasses such as in maize, sorghum, rye, oats, June grass and timothy and their leaves and stalks.

These various forage and fodder legumes and grasses may, for example, be extracted by the use of a fat soluble solvent such as hexane or extracted in a series of organic solvent extraction procedures in order to obtain either the fat soluble vitamins which may be dispersed in the glyceride oils normally contained in these various compositions or the substantially pure fat soluble vitamins which may be freed from the glyceride oils in which they are soluble.

Any of these vitamin compositions or fish or fish liver oils and unsaponifiable fractions removed therefrom may be utilized for dispersion in a major amount of the concentrated corn extract produced by extraction with dilute sulfurous acid in accordance with the present invention.

In the case of the vitamin containing glyceride oils which may be dispersed in the corn extract there may be utilized dependent upon the vitamin concentration, portions as high as 35% to 40% of oil against the weight of the concentrated corn extract, but in any event a minor amount of the vitamin containing glyceride oil is utilized and desirably 25% or less is dispersed through the extract.

In addition to the fat soluble vitamins, there may less preferably be utilized for dispersion in a minor amount through a large body of this corn extract, compositions which may contain these vitamin oils, such as alfalfa and other fodder and forage legumes and grasses as well as the various cereal grasses.

Where the oil soluble vitamin composition is in substantially pure form, it may be dispersed in a very minor amount such as less than 5% against the weight of the concentrated corn extract.

Following dispersion or homogenization of these vitamin containing oils in the corn extract, the final product may be dried, preferably under reduced pressure or in the presence of an inert gas.

The combination may also be placed through an homogenizer or colloid mill under vacuum or under inert gas in order to prevent the inclusion of air during the dispersion of the vitamin containing oil in the concentrated extract.

After dispersion of the vitamin containing oil in the concentrated extract, the combined product may be dried by admixing in a minor proportion with a major proportion of various meals and flour compositions. Among these compositions there are included the brans, particularly wheat and corn bran, oats, rye, soya bean flour, alfalfa and cereal grasses. It is particularly desirable for the combination of the dispersed vitamin product and the bran or soya bean meal to be placed under reduced pressure and at a slightly elevated temperature in order to obtain a perfectly dry product without the use of excessively high temperatures or long time drying procedures.

Particularly where the dispersed vitamin combination is to be dried by combining with a bran, particularly wheat bran, the bran is desirably first pre-dried to less than 2% total moisture content and then combined with the extract containing the vitamin oil dispersed therein.

For example, wheat bran normally containing about 10% to 12% total moisture may be dried to less than 2% total moisture content by placing in a revolving drum with agitators and at a temperature of 150° F. to 160° F. or higher and after the wheat bran has been dried down to less than 2% total moisture content, there may be added to it a minor proportion, preferably less than 35% and desirably less than 25%, of the concentrated extract containing in dispersed form the vitamin oil composition. The vitamin oil dispersion will thereupon be absorbed into the particles of the bran to form a homogeneous, dry mass which may be ground or more finely divided where desired.

Even though the concentrated corn extract is dried on the surface of the bran particles and would under normal conditions be exposed to large contact with air and oxidation, nevertheless where the bran is pre-dried in the aforesaid manner, and then combined with the vitamin oil dispersion, the finished product is not only obtained in dry, finely divided form, but is also stabilized against oxidative deterioration.

In addition to the brans, such as wheat, corn and oat bran, which may be pre-dried in this manner and then combined with the dispersion, the high protein containing materials may also be pre-dried including soya bean flour and powdered skim milk.

The dispersion of the vitamin containing oil in the concentrated corn extract may also be added to three to five times its weight of wheat bran or similar carrier material and thoroughly admixed therewith under reduced pressure and at a slightly elevated temperature of about 150° F. until the combination is thoroughly dried As a preferable procedure, however, the bran is without first pre-drying. pre-dried to less than about 2% total moisture content and then combined with 10% to 25% of its weight of the dispersion of the vitamin containing oil in the concentrated corn extract and so that the final product will contain not in excess of about 12% total moisture content.

To the corn extract, there may also be added a small amount of lecithin or other phosphatides, phosphoric acid, aliphatic polycarboxylic acids such as tartaric acid, citric acid, succinic acid, etc., and also molasses, particularly blackstrap molasses.

For example, a combination of from 25% to 75% of the corn extract and 75% to 25% of blackstrap molasses may be prepared and utilized as the aqueous continuous phase in which cod liver oil or similar fish or other vitamin oil is dispersed or emulsified.

The fat soluble vitamin containing oils may also be utilized when distributed or dissolved in castor oil, refined white mineral oil as well as in glyceride oils and fats, other than those in which they naturally occur. These various oils may thereupon be utilized for dispersion through the concentrated corn extract in accordance with the procedure of the present invention.

Where desired, the sulfurous acid extract of corn produced by the present procedures may be treated with a low molecular weight aliphatic alcohol, preferably methanol or isopropyl alcohol so that the finished combination contains from 4 to 9 parts of water and alcohol to each part of the solids in the extract, the alcohol and water being present in proportions varying from 1 to 7 parts of alcohol to each 2 parts of water.

Preferably about 5 to 7 parts of a 60% isopropanol and 40% water combination are present to each part of the solids in the extract. For example, if the concentrated water extract of the corn has been evaporated down to 50% total solids and if the extract in concentrated form amounts to 100 pounds, there will be prepared a mixture of 210 pounds of iso-propanol and 90 pounds of water and the 100 pounds of the concentrated water extract (containing 50 pounds solids and 50 pounds water) will be added to this alcohol-water mixture, the final ratio of water and alcohol being 40% water and 60% alcohol with the water and alcohol being present in an amount of 7 times that of the solids in the water extract.

In addition to iso-propanol, other low molecular weight aliphatic alcohols such as methyl, ethyl, butyl and propyl alcohol may be employed.

The extract-alcohol-water combination is then mixed sufficiently well so that each particle of the extract is brought into intimate contact with the alcohol, preferably at room temperature and for at least 5 to 10 minutes.

Precipitation occurs immediately and the mixture is stirred until all precipitable matter is formed.

The precipitate is then removed by centrifuging, filtration or similar means and the alcohol-water soluble fraction is then evaporated, preferably under reduced pressure, until the total solids are over 50% and preferably until the total solids are higher than the total solids of the original concentrated water extract, such as from 70% to 80% total solids.

A yield of from 25% to 40% of the alcohol-water soluble fraction is obtained against the solids in the first water soluble extract.

This special alcohol purification procedure may be conducted without neutralizing the original acid of the corn extract and following the alcohol purification the pH may be adjusted to between about 5 and 5.5 and preferably to a pH of between 5.2 and 5.3.

The extract thus obtained is a rather dark but brilliantly clear extract which is completely water soluble and which does not leave any undesirable coagulated residues. At the same time this extract has enhanced antioxygenic properties and may be used as the aqueous continuous medium for dispersion of the oil soluble vitamins in accordance with the procedure of the present invention in order to retard oxidative deterioration and spoilage of those oil soluble vitamins.

The present application is a continuation in part of application, Serial No. 330,985 filed April 22, 1940, and application, Serial No. 331,185 filed April 23, 1940, and through said applications the present application is a continuation in part of those applications which matured into Patents 2,198,210, 2,198,214, 2,198,215 and 2,198,218.

Having described my invention, what I claim is:

1. A substantially stabilized food product comprising a dispersion of a minor amount of a vitamin containing glyceride oil in a major amount of dilute sulphurous acid extract of corn, said extract containing in excess of 40% total corn extract solids.

2. A substantially stabilized food product comprising a dispersion of a minor amount of an oil soluble vitamin containing composition in a major amount of a dilute sulphurous acid extract of corn, said extract containing in excess of 40% total corn extract solids.

3. A substantially stabilized food product comprising a dispersion of a minor amount of an oil soluble vitamin concentrate in a major amount of a dilute sulphurous acid extract of corn, said extract containing in excess of 40% total corn extract solids.

4. A substantially stabilized food product comprising a dispersion of a minor amount of a vitamin containing fish oil in a major amount of a dilute sulphurous acid extract of corn, said extract containing in excess of 40% total corn extract solids.

5. A substantially stabilized food product comprising a dispersion of a minor amount of a vitamin containing fish liver oil concentrate in a major amount of a dilute sulphurous acid extract of corn, said extract containing in excess of 40% total corn extract solids.

6. A method of producing food compositions which are stabilized against oxidative deterioration which comprises dispersing a minor amount of an oil soluble vitamin containing composition in a major amount of a concentrated extract of corn, said corn having been extracted with dilute sulphurous acid at a pH between 3 and 4.5, whereby the food composition is substantially stabilized against oxidative deterioration.

7. A method of producing food compositions which are stabilized against oxidative deterioration which comprises dispersing a minor amount of a vitamin containing glyceride oil in a major amount of a concentrated extract of corn, said corn having been extracted with dilute sulphurous acid at a pH between 3 and 4.5, whereby the food composition is substantially stabilized against oxidative deterioration.

8. A method of producing food compositions which are stabilized against oxidative deterioration which comprises dispersing a minor amount of an oil soluble vitamin containing composition in a major amount of a concentrated extract of corn, and then drying, said corn having been extracted with dilute sulphurous acid at a pH between 3 and 4.5, whereby the food composition is substantially stabilized against oxidative deterioration.

SIDNEY MUSHER.